United States Patent
Virgallito et al.

(10) Patent No.: US 11,160,292 B2
(45) Date of Patent: *Nov. 2, 2021

(54) PROTEIN-POLYSACCHARIDE MACROMOLECULAR COMPLEX ARTICLE OF MANUFACTURE CONTAINING ENCAPSULATED ETHYL ALCOHOL

(71) Applicant: CURE PHARMACEUTICAL HOLDING CORPORATION, Oxnard, CA (US)

(72) Inventors: Margaret Teresa Thomas Virgallito, Beavercreek, OH (US); Joshua Alan Held, Riverside, CA (US)

(73) Assignee: Cure Pharmaceutical Holding Corp., Oxnard, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/559,797

(22) Filed: Sep. 4, 2019

(65) Prior Publication Data

US 2019/0387767 A1    Dec. 26, 2019

Related U.S. Application Data

(63) Continuation of application No. 13/444,852, filed on Apr. 12, 2012, now Pat. No. 10,470,478.

(51) Int. Cl.
| | |
|---|---|
| A23G 3/42 | (2006.01) |
| A23G 3/44 | (2006.01) |
| A23P 10/30 | (2016.01) |
| A23L 33/17 | (2016.01) |

(52) U.S. Cl.
CPC ............... *A23G 3/42* (2013.01); *A23G 3/44* (2013.01); *A23P 10/30* (2016.08); *A23L 33/17* (2016.08)

(58) Field of Classification Search
CPC .. A23G 3/42; A23G 3/44; A23L 33/17; A23L 29/284; A23P 10/30
USPC .......................................................... 426/103
See application file for complete search history.

(56) References Cited

U.S. PATENT DOCUMENTS

| | | | | |
|---|---|---|---|---|
| 5,846,530 | A | * 12/1998 | Soon-Shiong | A61F 13/02 424/93.7 |
| 2006/0292212 | A1 | * 12/2006 | Paris | A61K 47/02 424/451 |
| 2010/0068350 | A1 | * 3/2010 | Shen | A23L 27/79 426/96 |

* cited by examiner

*Primary Examiner* — Jyoti Chawla
(74) *Attorney, Agent, or Firm* — Carlson Caspers

(57) ABSTRACT

An protein-polysaccharide macromolecular complex article of manufacture containing encapsulated ethyl alcohol and/or other spirits serving as an entertaining and novel non-beverage method of consuming alcohol. The article of manufacture encapsulates ethyl alcohol and/or other spirits in the amorphous regions of the complex macromolecular structure releasing it only upon chewing and exposure to the environment of the oral cavity. The article of manufacture is stable and capable of retaining shape and form for extended periods of time at ambient temperature allowing for relatively low-cost commercial manufacture and distribution.

20 Claims, 1 Drawing Sheet

PROTEIN-POLYSACCHARIDE MACROMOLECULAR COMPLEX ARTICLE OF MANUFACTURE CONTAINING ENCAPSULATED ETHYL ALCOHOL

FIELD OF THE PRESENT DISCLOSURE

This disclosure relates generally to innovative packaging and presentation of ethyl alcohol for personal consumption and more particularly to an article of manufacture featuring encapsulated ethyl alcohol and/or spirits in a consumable protein-polysaccharide macromolecular complex delivery system capable of holding its shape and structure and releasing the encapsulated ethyl alcohol and/or spirits upon chewing or exposure to the environment of the oral cavity.

BACKGROUND OF THE RELATED ART

Spirits and other alcoholic beverages are served for consumption in a variety of ways. The most basic method of serving an alcoholic beverage is in a glass, appropriately configured to deliver a serving-sized portion of the selected beverage. To increase consumer interest and to compete for market share, purveyors of spirits and other alcoholic beverages often attempt to create alternative and entertaining methods of presenting and serving their products. These methods include innovative packaging and delivery systems ranging from simple improvements in presentation, such as serving ale in a yard glass, to more involved creations, such as adding flavors and elaborate garnishing.

There have been considerable efforts in the past to produce ethyl alcohol products in other than beverage form. Various candies and foods containing ethyl alcohol have been envisioned and produced. However, typically the ethyl alcohol content in these products are highly diluted and they are often too filling or rich to serve as an acceptable method of consuming more than a very insignificant quantity of alcohol.

One popular non-beverage alternative method of presenting ethyl alcohol for consumption is often referred to as a Jell-O shot. A Jell-O shot is named after the trademark of a popular brand of dessert made from sweetened and flavored gelatin. It is prepared by bringing water to boil and mixing flavored and sweetened gelatin. The resulting mixture is then cooled, ethyl alcohol and/or other spirits are added, and it is poured into serving sized portions. The serving sized portions are subsequently refrigerated allowing the gelatin to form a gel. Once the gel is formed or set, the Jello-O shot is kept refrigerated until shortly before consumption. The refrigeration is required because gelatin, which consists of partially hydrolyzed collagen, forms a thermally reversible gel with water upon cooling that deteriorates if the gel's temperature is subsequently raised above approximately 35 degrees Celsius. While 35 degrees Celsius is above typical ambient room temperature, the gel tends to soften and lose form and structure as it approaches that temperature; therefore, it may not exhibit ideal structural properties at ambient room temperature. Also, if not chilled, a Jell-O shot will begin to melt and become messy immediately upon being handled since human body temperature is above 35 degree Celsius. These limitations are significant complications to any commercial production effort.

There exists a demand for a more structurally firm and thermally stable, non-beverage delivery system for the consumption of ethyl alcohol. Several attempts have been made to meet this demand, however, in each case, challenges in encapsulation technology and chemistry have proved too great, leading to less desirable or compromised products.

One such attempt is described in U.S. Pat. No. 2,780,355. This disclosure teaches the use of plasticized gelatin shells as an encapsulation shell. However, this method is unsatisfactory because the encapsulated ethyl alcohol will typically diffuse through a gelatin shell due to its low molecular weight unless it is dissolved in a dispersant such as polyethylene glycol. Further, the additional of polyethylene glycol still does not prevent all leakage as determined upon observation after three weeks and it introduces additional concerns such as its mildly toxicity, and the further dilution of the ethyl alcohol.

Another such method is described in U.S. Pat. No. 4,507,327. This disclosure teaches an encapsulation process including the steps of dropping a core liquid into a solution of alginic acid salt and calcium salt to form a calcium alginate membrane, waiting for the calcium alginate membrane to form, extracting the core liquid from the capsule, and exchanging it for the desired edible fluid such as ethyl alcohol. However, problems with leaking and oozing exist with this method as well. Further, this method is relatively labor intensive which presents commercialization challenges.

U.S. Pat. No. 5,330,835 teaches yet another method including the use of a viscous liquid that is scarcely miscible with water to form a barrier between the hydrophilic edible liquid containing ethyl alcohol and the gelatin based encapsulation membrane. The scarcely miscible liquid serves to prevent migration of the hydrophilic edible fluid into the encapsulation membrane resulting in a softening of the membrane and the encouragement of bacteria and mold growth. However, concomitant with the beneficial use of a scarcely miscible liquid, such as coffee oil as is taught in this reference, comes the adverse result of leaving an oily or waxy residue in the mouth of the consumer making the consumable less desirable.

There exists a demand for a commercially viable non-beverage delivery system for the consumption of ethyl alcohol that exhibits minimal organoleptic qualities and is not disposed to oozing or leakage.

The present disclosure distinguishes over the related art providing heretofore unknown advantages as described in the following summary.

BRIEF SUMMARY OF THE INVENTION

The present disclosure describes a consumable protein polysaccharide macromolecular complex delivery system capable of encapsulating ethyl alcohol, other spirits, and/or non-alcoholic beverages in amorphous regions of the protein-polysaccharide complex polymeric structure. The retention and release of the encapsulated material is superior to other gel systems in that the encapsulated material is only released upon chewing or exposure to the environment of the oral cavity.

The consumable protein-polysaccharide macromolecular article of manufacture is the result of complex coacervation of a protein and a polysaccharide that occurs when the constituents are thoroughly mixed in an acidic ethyl alcohol-water solution at approximately forty degrees Celsius. Both the protein and the polysaccharide are soluble in ethyl alcohol, water, and/or an ethyl alcohol-water solution. While in solution, macromolecular hydrogel structures develop as the result of the formation of linkages between the protein and the monomeric constituents of the polysaccharide, with the protein being the cationic polymer and the polysaccharide being the anionic polymer. The ethyl alcohol becomes encapsulated in the amorphous regions of the macromolecular hydrogel structures.

The function of the protein is to serve as a gelling agent. In a preferred embodiment, the gelling agent is an animal protein such as gelatin. Gelatin can be sources from pig, beef, chicken, or fish. Alternatively, one can also use dairy proteins or protein sourced from eggs. Carbohydrate gelling agents from vegetable sources such as but not limited to starch, alginate, pectin, agar, carrageenan are acceptable as well, however, they are less desirable than animal proteins because they lack the elastic properties of animal proteins as well as having the tendency to deteriorate upon exposure to an environment similar to the oral cavity.

The polysaccharide provides the protein-polysaccharide macromolecular article of manufacture with enhanced structural integrity. In a preferred embodiment the polysaccharide is pullulan. Pullulan is an extracellular water-soluble microbial polysaccharide produced by strains of *Aureobasidium pullulans*. Pullulan exhibits many qualities that make it useful as an adhesive binder, thickener, and/or an encapsulation agent. Other polysaccharides including but not limited to dextrans having various contents of galactin, isolichen, laminaran, levans, pullulan, and yeast mannan are acceptable as well. The molecular configuration of the polysaccharide controls the manner in which it accommodates mechanical stress, and therefore it plays an important role in modulating ligand binding and its elastic properties.

The resulting consumable protein-polysaccharide macromolecular article of manufacture is an ideal delivery system for the non-beverage consumption of ethyl alcohol because it displays characteristics of both the protein and the polysaccharide without exhibiting any significant organoleptic qualities. The polysaccharide provides the article of manufacture with an elastic, yet firm, composition that encapsulates ethyl alcohol without leakage or oozing, while the protein provides the article with gelatinous texture and the ability to break down upon chewing and exposure to the environment of the oral cavity.

This disclosure teaches certain benefits in construction and use which give rise to the objectives described below.

A primary objective inherent in the above disclosure is to provide a novel and entertaining non-beverage consumable article of manufacture containing ethyl alcohol and/or other spirits.

Another objective of the above disclosure is to provide a novel and entertaining non-beverage consumable article of manufacture containing ethyl alcohol and/or other spirits capable of retaining shape and form for an extended period of time at ambient room temperature.

A further objective of the above disclosure is to provide a novel and entertaining non-beverage consumable article of manufacture containing ethyl alcohol and/or other spirits capable of releasing such alcohol and other spirits upon chewing or exposure to the environment of the oral cavity.

A still further objective of the above disclosure is to provide a novel and entertaining non-beverage consumable article of manufacture containing ethyl alcohol and/or other spirits that exhibit minimal organoleptic qualities.

A yet still further objective of the above disclosure is to provide a novel and entertaining non-beverage consumable article of manufacture containing ethyl alcohol and/or other spirits that will not soften or dissolve when exposed to ambient room temperature water.

Other features and advantages of the present invention will become apparent from the following more detailed description, taken in conjunction with the accompanying drawings, which illustrate, by way of example, an exemplary embodiment of the presently described article of manufacture.

BRIEF DESCRIPTION OF THE SEVERAL VIEWS OF THE DRAWING(S)

The accompanying drawings illustrate exemplary implementations and are part of the specification. The illustrated implementations are proffered for purposes of example not for purposes of limitation. Illustrated elements will be designated by numbers. Once designated, an element will be identified by the identical number throughout. Illustrated in the accompanying drawings in at least one of the best mode embodiments of the present disclosure. In such drawings.

DETAILED DESCRIPTION OF AN EXEMPLARY EMBODIMENT

Figure 1:
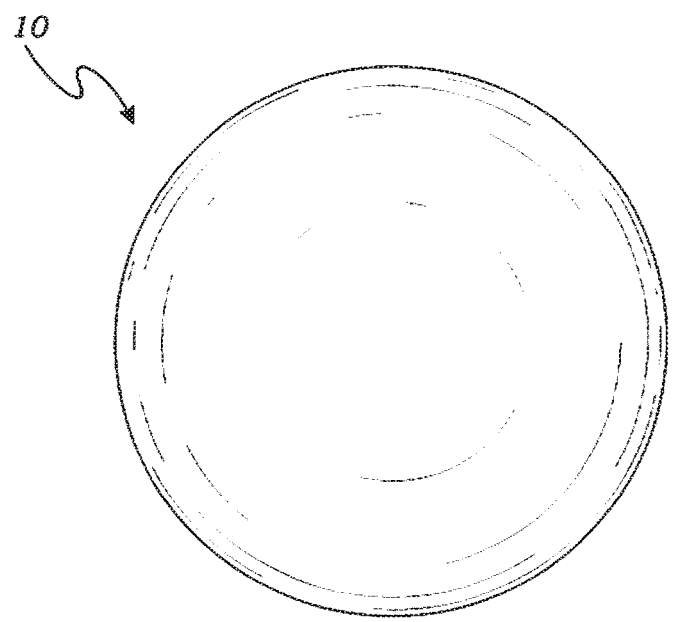
FIG. 1 is a plan view of an exemplary embodiment of the presently described consumable article of manufacture containing ethyl alcohol and/or other spirits.

The drawing figures illustrate an exemplary embodiment of the protein-polysaccharide article of manufacture in at least one of its preferred, best mode embodiments, which is further defined in detail in the following description. Those having ordinary skill in the art may be able to make alterations and modifications to what is described herein without departing from the spirit and scope of the disclosure. Further, it must be understood that what is illustrated is set forth only for the purposes of example and that it should not be taken as a limitation in the scope of the presently described article of manufacture.

Described now in detail is a novel and entertaining non-beverage protein-polysaccharide consumable article of manufacture containing encapsulated ethyl alcohol and/or other spirits. The article of manufacture is able to exhibit a desired blend of physical and organoleptic properties because of the unique individual properties of both the protein and polysaccharide subparts and because of the synergistic manner in which they combine. The article of manufacture comprises between 10% and 25% by weight water-soluble protein, between 0.1% and 7.5% by weight water-soluble polysaccharide, and between 60% to 90% by weight ethyl alcohol solution. In an alternative non-alcoholic embodiment, rather than the ethyl alcohol solution the article of manufacture could also comprise between 60% and 90% by weight water soluble sweetener and/or flavoring.

The protein in the non-beverage protein-polysaccharide is preferably an animal protein such as gelatin. As previously explained, the animal protein gelatin is the product of denaturation or disintegration of collagen. Collagen exhibits multiple alpha chains that are held together with several different but easily reducible cross links. The protein is made up of peptide triplets, glycerin —X-Y, where X and Y can be any one of the amino acids but proline has a preference for the X position and hydroxyproline has a preference for the Y position. Approximately 1050 amino acids produce an alpha-chain with a left-handed proline helix conformation.

There are two main types of gelatin. Type A, with an isotonic point between 7 and 9, is derived from collagen with only acid-based pretreatment. Type B, with an isotonic point between 4.8 and 5.2, is the result of an alkaline pretreatment of collagen. Both varieties of gelatin are acceptable component proteins for the presently disclosed article of manufacture and a selection may be made based on the varying physical properties, such as gel strength, to suit particular preferences.

The polysaccharide in the non-beverage protein-polysaccharide is preferably pullulan. Other polysaccharides including, but not limited to, dextrans having various contents of galactin, isolichen, laminaran, levans, pullulan, and yeast mannan are acceptable as well. Dextrans have a series of pyranose rings comprising five carbon atoms and one oxygen atom. The pyranose rings are linked creating backbone of alpha linked d-glucopyranosyl repeating units. The pyranose ring is the structural unit controlling the elasticity of the polysaccharide. The elasticity is a function of the force-induced elongation of the pyanose rings which transitions the ring's structure from a chair-like to a boat-like conformation.

There are three classes of dextrans that can be differentiated by structural architecture. Class 1 dextrans comprise an alpha (1→6) linked d-glucopyranosyl backbone modified with small side chains of monomeric d-glucose branches with alpha (1→2), alpha (1→3), and alpha (1→4) linkages. Class 2 dextrans (alternans) contain a backbone of alternating alpha (1→3) linked and alpha (1→6) linked d-glucopyranosyl units with alpha (1→3) linked monomeric constituent branches. Class 3 dextrans (mutans) have a backbone structure of consecutive alpha (1→3) linked d-glucopyranosyl units with alpha (1→6) linked monomeric constituent branches.

When both the protein and the polysaccharide are dissolved in a water-ethyl alcohol solution and/or a water-sweetener and/or flavoring solution at a temperature elevated to approximately 35-40 degrees Celsius, linkages form between the protein and the monomeric constituents of the polysaccharide with the protein being the cationic polymer and the polysaccharide being the anionic polymer forming macromolecular hydrogel structures that encapsulate the solvent. The complex coacervation can form numerous modes of linkage between the protein and the polysaccharide due to the diverse nature of the polysaccharide monomeric constituents. The resulting macromolecular hydrogel structures may be transferred into molds and cooled, forming firm yet pliable articles of manufacture.

FIG. 1 illustrates an exemplary spherically molded embodiment of the presently described article of manufacture 10. The spherical shape is for example only, as the article of manufacture may be molded to any desired shape. In fact, the article of manufacture may assume many forms including: micro-sphere; macro-sphere; particle; film; agglomerate; filament; or alternative molds.

Figure 2:
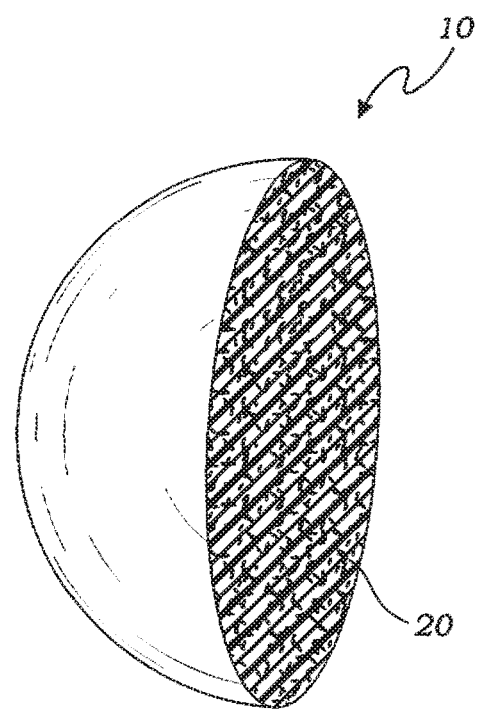
FIG. 2 is a perspective view of a cross section of an exemplary embodiment of the presently described consumable article of manufacture containing ethyl alcohol and/or other spirits.

FIG. 2. illustrates a spherical molded embodiment of the presently described non-beverage consumable article of manufacture 10 cut in half. This perspective illustrates that the article of manufacture 10 is composed of the same consistency throughout, with the ethyl alcohol and/or other spirit and/or sweetener and flavoring encapsulated within the amorphous regions of the protein-polysaccharide macromolecular complex as opposed to being encapsulated in a free-liquid form within a shell or impermeable barrier. The encapsulation within the amorphous regions allows a consumer to bite into the article of manufacture without concern of releasing or spilling the free-liquid ethyl alcohol within.

Figure 3:
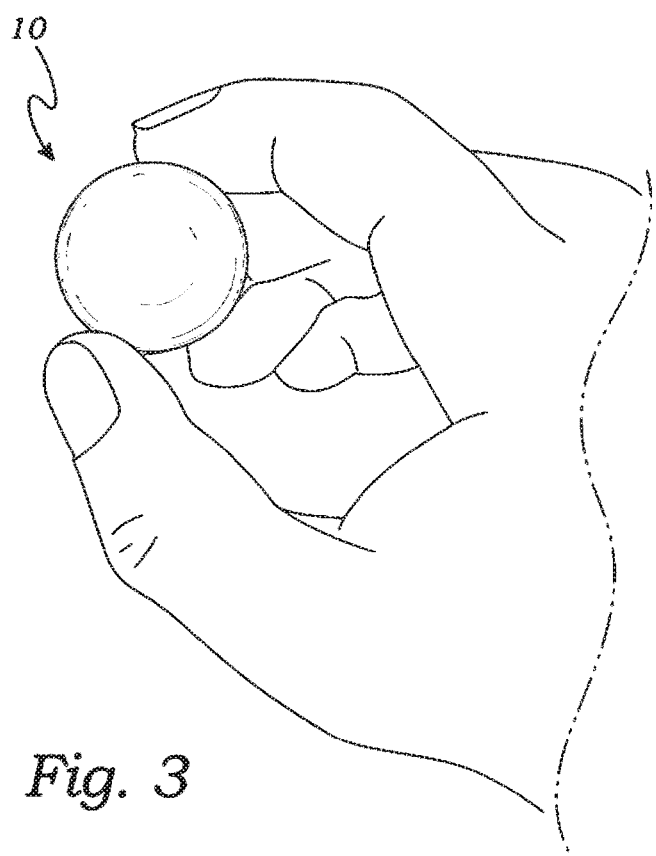
FIG. 3 is a perspective view of an exemplary embodiment of the presently described consumable article of manufacture containing ethyl alcohol and/or other spirits shown being grasped between the index finger and thumb of a human hand.

FIG. 3 illustrates the same spherically molded embodiment of the presently described article of manufacture as depicted in FIG. 1 and FIG. 2, but places it in the context of a human hand for scale. The exemplary embodiment is sized such that a human could consume the article of manufacture in one or two bites. This approximate size is preferred, however, it is not meant to be limiting. The article of manufacture may be produced to any scale desired.

Various specific examples of the above described article of manufacture follow:

Example 1

A 20% protein and polysaccharide solution was prepared by dissolving 15 grams of pork gelatin and 5 grams of pullulan into 75.5 grams of an ethyl alcohol solution containing between 50% and 60% water by weight and between 40% and 50% ethyl alcohol by weight. Dissolution was performed in a closed vacuum reactor elevated to between 35 and 40 degrees Celsius. The solution was mechanically stirred at 150 rpm until the protein and polysaccharide solution appeared fully wetted, and then stirring was continued for an additional 30 minutes to ensure complete dissolution. A combination of plasticizer, flavor, and sweetener was mixed until homogeneous, and then slowly added into the protein polysaccharide solution and stirred at 150 rpm for 15 minutes. A vacuum was pulled at 20 psi and the mixture was stirred for an additional 15 minutes. The resulting solution was then transferred to spherical molds and cooled to 3 to 5 degrees Celsius, and held at temperature for 15 minutes. Then the molds were slowly raised to 22 degrees Celsius and the protein-polysaccharide articles of manufacture were removed from the molds.

The resulting macromolecular articles of manufacture were stable and exhibited an ability to hold shape and form throughout a temperature range from 5 degrees to 30 degrees Celsius. Further, the macromolecular structures demonstrated an ability to withstand between 8 and 10 Newtons of compression force. When the force was applied, the articles of manufacture deformed elastically and fully recovered when the force was removed. Compression testing was performed using a SHIMPO FGV 10X.

Dissolution tests were run as well, using both de-ionized and carbonated water. The articles of manufacture were placed into 200 grams of water at 24 degrees Celsius. The water was mechanically stirred at 100 rpm for 24 hours. In each case, upon removal from the water, the articles of manufacture were slightly swollen but displayed no signs of dissolution. While still in the swollen state, the articles of manufacture were retested for compression and withstood between 4 and 8 Newtons of compression force. The articles of manufacture exhibited greater deformation than before, but the deformation remained fully elastic and therefore the articles of manufacture returned to their original shape and form when the compression force was removed.

The protein-polysaccharide articles of manufacture were also subjected to sensory tests to gauge alcohol flavor intensity. Ten individuals, both male and female, were asked to chew the articles of manufacture for 5 minutes while describing the alcohol flavor intensity on a scale from 1 to 12 every 30 seconds. All of the participant's alcohol flavor intensity ratings closely corresponded, beginning with 1 and increasing linearly to a score of 9 or 10 at the end of the 5 minute period. The test results demonstrate that that articles of manufacture effectively release the ethyl alcohol upon chewing and exposure to the environment of the oral cavity as desired.

Example 2

A 25% protein and polysaccharide solution was prepared by dissolving 20 grams of pork gelatin and 5 grams of pullulan into 70.5 grams of an ethyl alcohol solution. The ethyl alcohol solution contained between 50% and 60% water by weight and between 40% and 50% ethyl alcohol by weight. Dissolution was carried out in a closed vacuum reactor at a temperature between 35 and 40 degree Celsius, and the solution was stirred at 150 rpm mechanically until the protein and polysaccharide was completely dispersed. Stirring was then continued for an additional 30 minutes to assure complete dispersion.

Next, a combination of plasticizer, flavor, and sweetener was mixed until homogeneous and slowly added to the protein-polysaccharide solution while mechanically stirring at 150 rpm for 15 minutes. The stirring was continued for an additional 15 minutes under a 20 psi vacuum.

The resulting mixture was poured into spherical molds and cooled to 3 to 5 degrees Celsius, held at temperature for 15 minutes, then allowed to warm to 22 degrees Celsius and removed from the molds. As in Example 1, the resulting protein-polysaccharide articles of manufacture were stable and demonstrated an ability to hold shape and form throughout a temperature range from 5 degrees to 30 degrees Celsius.

The Example 2 articles of manufacture were then similarly tested for compression strength using a SHIMPO FGV 10X. The Example 2 articles of manufacture deformed elastically while withstanding 12 to 15 Newtons of compression force. This is an increase over the 8 to 10 Newtons of compression force endured by the Example 1 articles of manufacture.

The Example 2 articles of manufacture were also subjected to dissolution testing as set forth in Example 1, and similar to the Example 1 articles of manufacture, the Example 2 articles of manufacture exhibited no discernible dissolution but were slightly swollen after 24 hours of soaking. When tested for compression strength in the swollen state, Example 2 articles of manufacture endured 6 to 10 Newtons of force but resumed shape and form when the force was removed.

COMPARISON STUDY

A comparison test was performed to demonstrate the beneficial synergistic effects of the protein-polysaccharide macromolecular structures. This test was conducted by creating articles of manufacture in which either the protein or the polysaccharide was omitted and comparing physical properties to the presently disclosed protein-polysaccharide articles of manufacture. The ingredients of all three test articles of manufacture are listed in the chart below.

| Ingredients | Protein Macromolecular Structure | Polysaccharide Macromolecular Structure | Protein-Polysaccharide Macromolecular Structure |
|---|---|---|---|
| Glycerin | 0.50% | 0.50% | 0.50% |
| Gelatin | 8% | | 15% |
| Agar | | 2.50% | |
| Pullulan | | 5% | 5% |
| Flavor | 2% | 2% | 2% |
| Sweetener-Superose | 1% | 1% | 1% |
| Ethyl Alcohol-Water Solution | | | 76.50% |
| Water | 68.5% | 69% | |
| Ethyl Alcohol | 20% | 20% | |
| Total | 100.00% | 100.00% | 100.00% |

Each sample was prepared by the same essential method. First the primary ingredients (e.g., the protein, polysaccharide, or both, and the water and ethyl alcohol) were mechanically stirred at 150 rpm in a closed vacuum reactor at 35 to 40 degrees Celsius for 30 minutes beyond the point in time in which the ingredients appeared to be dispersed. Then the plasticizer, sweetener, and flavor were added while stirring continued for an additional 15 minutes. Next a 20 psi vacuum was pulled on the reactor, and stirring was continued for an additional 15 minutes. The resulting mixture was transferred to spherical molds and reduced in temperature to 3 to 5 degrees Celsius, held at temperature for 15 minutes, allowed to slowly increase in temperature to 22 degrees Celsius, and subsequently removed from the molds.

The physical properties of the three resulting test articles of manufacture were significantly different. The protein-only macromolecule structures were weak in shape and form immediately upon being removed from the mold. When tested for compression strength using a SHIMP FGV 10X, the protein-only articles of manufacture lost shape and form during testing after being exposed to only 0.9 Newtons of compression force. Further, at ambient temperature, the protein-only macromolecular articles of manufacture began to melt after only 60 minutes.

The polysaccharide-only macromolecular structures performed even worse. Immediately upon being removed from the mold, the polysaccharide-only macromolecular structures exhibited a very limited ability to hold shape and form, and began to melt upon being exposed to ambient conditions for approximately 15 minutes. When tested for compression, the polysaccharide-only macromolecular structures withstood 0 Newtons of compression force and broke apart during testing.

As expected, the protein-polysaccharide macromolecular structure demonstrated a robust ability to sustainably hold both shape and form at ambient temperatures for an extended period of time. When tested for compression, the protein-polysaccharide macromolecular structure withstood 9.7 Newtons of compression force. The structure deformed elastically during compression but returned to its pretesting mold shape when the compression force was removed. The stability and durability of the protein-polysaccharide macromolecular structures allow for relatively simple, low-cost commercial production and distribution.

The enablements described in detail above are considered novel over the prior art of record and are considered critical to the operation of at least one aspect of the presently described article of manufacture, and to the achievement of the above-described objectives. The words used in this specification to describe the instant embodiments are to be understood not only in the sense of their commonly defined meanings, but to include by special definition in this specification: structure, material, or acts beyond the scope of the commonly defined meanings. Thus, if an element can be understood in the context of this specification as including more than one meaning, then its use must be understood as being generic to all possible meanings supported by the specification and by the word(s) describing the element.

The definitions of the words or drawing elements described herein are meant to include not only the combination of elements which are literally set forth, but all equivalent structures, materials or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, substitutions, now or later known to one with ordinary skill in the art, are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that the named inventors believe that the claimed subject matter is what is intended to be patented

What is claimed is:

1. A protein-polysaccharide macromolecular complex article of manufacture comprising: between 10% and 25% by weight water-soluble protein; between 0.1% and 7.5% by weight water-soluble polysaccharide; and between 60% and 90% by weight ethyl alcohol solution, wherein the ethyl alcohol solution is encapsulated in the macromolecular complex, and wherein said article of manufacture is stable and holds shape and form over a temperature range of 5 degrees to 30 degrees Celsius.

2. An article of manufacture as in claim 1, wherein said water-soluble polysaccharide is composed of dextrans comprising units linked through alpha (1→6) glucosidic bonds.

3. An article of manufacture as in claim 1, wherein said water-soluble polysaccharide is composed of dextrans comprising units linked through alternating alpha (1→2), alpha (1→3), and alpha (1→4) glucosidic bonds.

4. An article of manufacture as in claim 1, wherein said water-soluble polysaccharide is composed of dextrans comprising units linked through consecutive alpha (1→3) glucosidic bonds.

5. An article of manufacture as in claim 1, wherein said water-soluble polysaccharide is a polysaccharide selected from the group consisting of galactan, iso lichen, laminaran, lavans, pullulan, yeast mannan, and any combination thereof.

6. An article of manufacture as in claim 1, wherein said water-soluble polysaccharide is pullulan.

7. An article of manufacture as in claim 1, wherein the water-soluble protein is a vegetable protein.

8. An article of manufacture as in claim 1, wherein said water soluble protein is an animal protein.

9. An article of manufacture as in claim 1 further comprising between 0.25% and 2.5% by weight of an acidulant.

10. An article of manufacture as in claim 9, wherein said acidulent is an acidulent selected from a group consisting of tannic acid, lactic acid, ascorbic acid, acetic acid, citric acid, maltic acid, adipic acid, fumaric acid, and any combination thereof.

11. An article of manufacture as in claim 1 further comprising between 0.125% and 2% by weight of a plasticizer.

12. An article of manufacture as in claim 11, wherein said plasticizer is a plasticizer selected from a group consisting of glycerin, propylene glycol, sorbitol, xylitol, lechitin, medium chain triglycerides, and any combination thereof.

13. A non-beverage article of manufacture for, the article comprising: between 10% and 25% by weight water-soluble protein; between 0.1% and 7.5% by weight water-soluble polysaccharide; and between 60% and 90% by weight non-alcoholic flavor solution, wherein the non-alcoholic flavor solution is encapsulated in a macromolecular complex, and wherein article of manufacture in stable and holds shape and form over a temperature range of 5 degrees to 30 degrees Celsius.

14. An article of manufacture as in claim 13, wherein said water-soluble polysaccharide is a polysaccharide selected from the group consisting of galactan, isolichen, laminaran, lavans, pullulan, yeast mannan, and any combination thereof.

15. An article of manufacture as in claim 14, wherein the water-soluble protein is a vegetable protein.

16. An article of manufacture as in claim 14, wherein said water-soluble protein is an animal protein.

17. An article of manufacture as in claim 14 further comprising between 0.25% and 2.5% by weight of an acidulant.

18. An article of manufacture as in claim 17, wherein said acidulent is an acidulent selected from a group consisting of tannic acid, lactic acid, ascorbic acid, acetic acid, citric acid, maltic acid, adipic acid, fumaric acid, and any combination thereof.

19. An article of manufacture as in claim 18 further comprising between 0.125% and 2% by weight of a plasticizer.

20. An article of manufacture as in claim 19, wherein said plasticizer is a plasticizer selected from a group consisting of glycerin, propylene glycol, sorbitol, xylitol, lechitin, medium chain triglycerides, and any combination thereof.

* * * * *